H. R. TIDSWELL.
SEX CALCULATOR.
APPLICATION FILED MAR. 30, 1920.
1,428,065.
Patented Sept. 5, 1922.
3 SHEETS—SHEET 1.
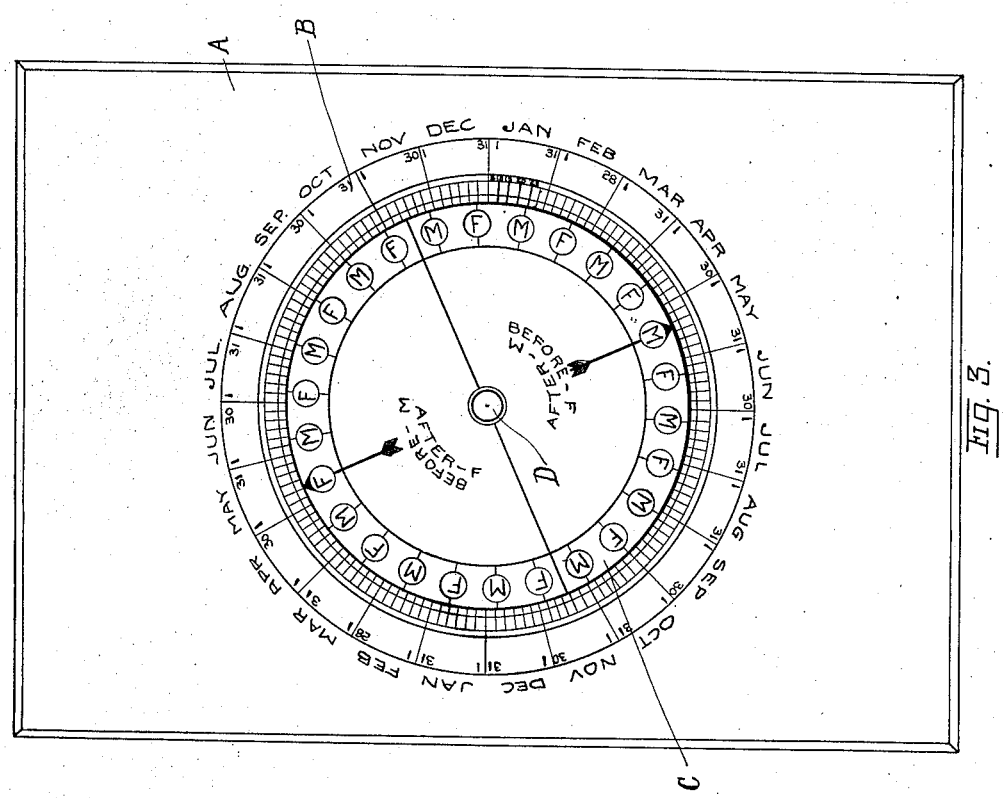
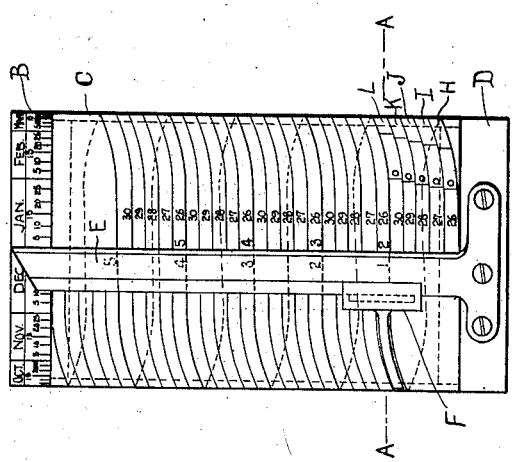
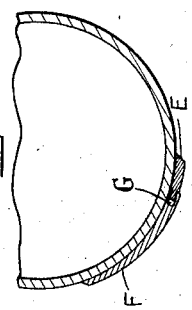
INVENTOR:

H. R. TIDSWELL.
SEX CALCULATOR.
APPLICATION FILED MAR. 30, 1920.
1,428,065.
Patented Sept. 5, 1922.
3 SHEETS—SHEET 2.
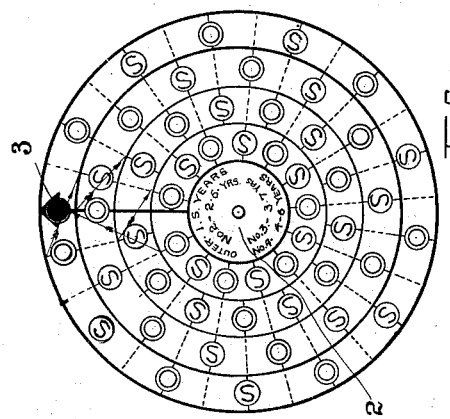
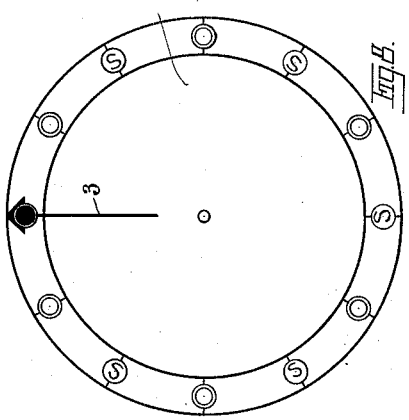
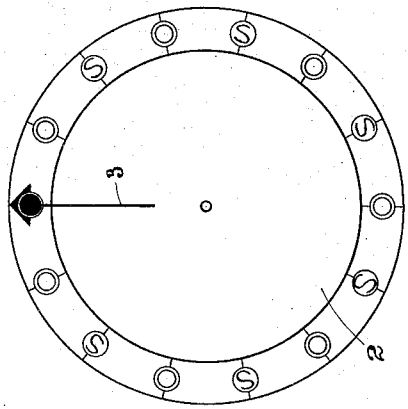
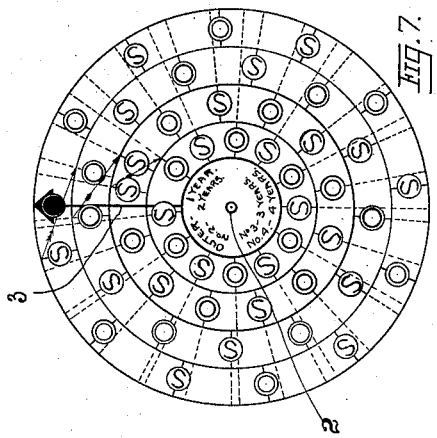
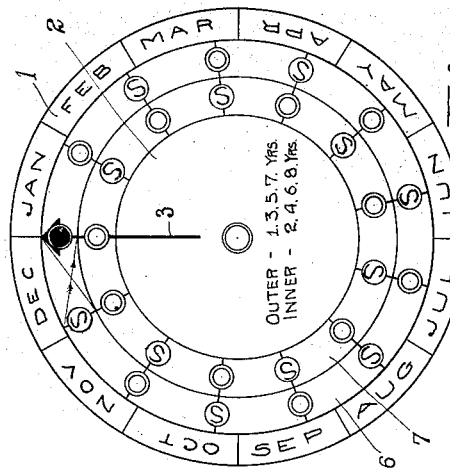
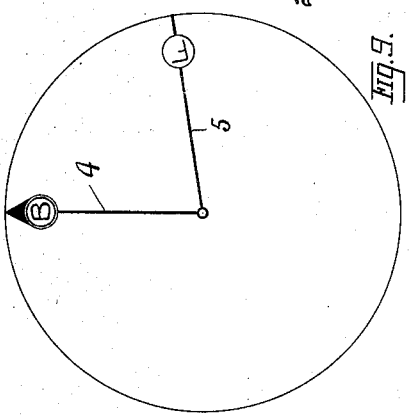
INVENTOR:

H. R. TIDSWELL.
SEX CALCULATOR.
APPLICATION FILED MAR. 30, 1920.

1,428,065.

Patented Sept. 5, 1922.
3 SHEETS—SHEET 3.

Patented Sept. 5, 1922.

1,428,065

UNITED STATES PATENT OFFICE.

HUBERT ROYDS TIDSWELL, OF WINNINGTON, ENGLAND.

SEX CALCULATOR.

Application filed March 30, 1920. Serial No. 369,927.

*To all whom it may concern:*

Be it known that I, HUBERT ROYDS TIDSWELL, a subject of the King of Great Britain and Ireland, residing at 46 Winnington Lane, Winnington, Cheshire, England, have invented certain new and useful Improvements in Sex Calculators; and I do hereby declare the following to be a full, clear, and exact description of the invention, such as will enable others skilled in the art to which it appertains to make and use the same.

A device for finding the sex of all children, born to the same woman, after the first child has been born, when one knows the approximate dates of births of the expected children and the sex of the child previously born. The device also shows when fertilization must take place for a particular sex to be born.

This invention is based on the well-known and proved theory that in normal women the ovaries ovulate alternately, and that one ovary always produces male ova and the other female ova, and that this action occurs at regular intervals, the sequence not being disturbed by gestation or lactation. Consequently if the date of birth and sex of first child born be known, one can predict or determine the sex of subsequent children. The device consists of two or more parts of any regular geometrical form, and on these parts are marked the months of the year with suitable sub-divisions, and the ovulation periods, the times of ovulation being marked with each sex alternately. Means are provided for moving the parts relatively to one another to enable the prediction or determination to be made. Provision can be made for the period of ovulation varying in different women.

*1st method.*

Fig. 1 is a front elevation of an appliance designed to effect the above requirements.

Fig. 2 is a section through A A on Fig. 1.

Figure 10:
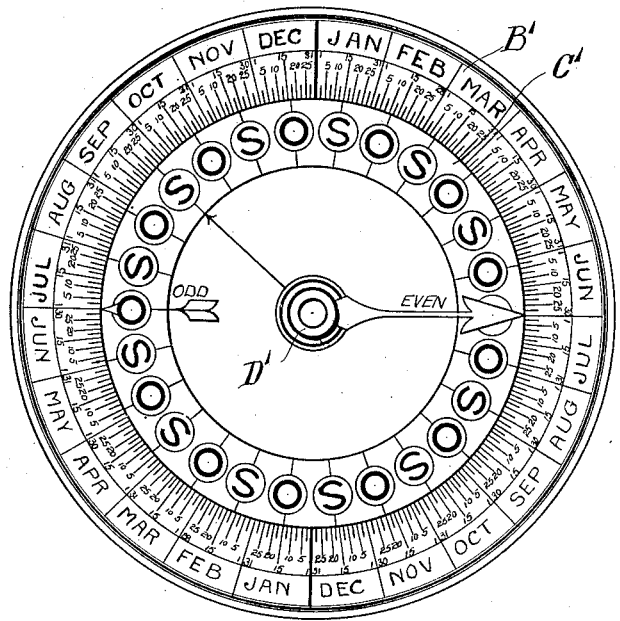

To carry out the above purposes, one method I adopt is to mount three cylinders B, C and D, preferably of the same diameter, with their axes in line and free to rotate about their axis relatively to one another. On the cylinder B are marked the months of the year, the periphery being divided into twelve main parts and suitably sub-divided to ensure sufficient accuracy. The cylinder C is graduated spirally, the number of complete turns of the spiral and its width being according to the number of years over which calculations are to be based—there being one complete turn of the spiral for each year—and according to the space desired for the parallel sub-divisions for the different ovulation periods, respectively. The spiral is sub-divided into as many parallel strips of equal width as are required for different ovulation periods. Fig. 1 shows a model designed for calculations up to five years and for five different ovulation periods of 26, 27, 28, 29 and 30 days each. Each of the five ovulation strips H, I, J, K, and L start from the same zero at the bottom of the spiral marked 1, 2—2, 3—3, 4—4, 5 so that the readings on the ovulation strips may be taken on that turn of the spiral devoted to any particular year. Counting the first ovulations from zero as number 1, all odd divisions have some mark to distinguish them from the even divisions alternate divisions representing different sexes. In Fig. 1 the odd divisions are marked "O." The ovulation strips are calibrated by projecting the divisions from the periphery of a cylinder of radius equal to that of the cylinder C say from the periphery of the cylinder B so that the distances between the divisions will truly define the ovulation periods when read in planes perpendicular to the axis of the cylinders. To cylinder D is attached a pointer E set parallel to the axis of the cylinders; it has one edge bevelled and is formed so that a sliding pointer F may be attached to it and moved longitudinally along it within the required range. In Fig. 2 a space G is shown for accommodating a spring to steady the pointer F. The distance between the bevelled edge of the pointer F and the pointer E is $\frac{365-280}{365}$ multiplied by the circumference of the cylinder and shows, when the calculator is used as directed below, the date of fertilization for a given sex to be born at a given date.

The action of the device is as follows:—

To predict the sex of a child, when the approximate date of its birth, the sex and date of birth of previous child born, and the ovulation period of the mother are known. Rotate the pointer E relative to the cylinder B until the bevelled edge is opposite the date of birth of last child; then rotate cylinder C until the zero of the spiral coincides with the bevelled edge of the pointer E; next rotate cylinder D carrying the pointer E until the bevelled edge coincides with the date of birth of coming child, and according to the number of years that intervene between the two births, consult that turn of the spiral which corresponds then the ovulation division coinciding with, or nearest to, the bevelled edge shows whether the sex will be the same as, or opposite to, that of the last one born, according to the manner in which it is marked, that is whether as being an even or odd division. Odd divisions show the opposite sex and even ones the same sex as that of the previous child born.

*To fix the sex of a child.*

Given the selection of two contiguous months in any year, the sex and date of birth of last child, and the ovulation period of the mother. Set the pointer E opposite the date of last child's birth and opposite the zero of the ovulation spiral on cylinder C; then move the cylinder D and the pointer F so that the pointer F comes on the correct ovulation strip, and on the correct complete turn of the spiral according to the number of years intervening, and opposite the correct ovulation division for the sex required, in whichever of the two months it happens to fall; then the pointer E will show that fertilization must take place before the ovulation of sex desired, which comes nearest to the date shown on cylinder B, by the index E.

*2nd method.*

Fig. 3 shows another form of appliance for effecting the first result-prediction.

A is a piece of suitable material, such as stiff cardboard, and of convenient size and shape. The months of the year B are shown on this in circular form on one semi-circumference and repeated in the same order on the other semi-circumference — the whole circumference representing two years. The divisions apportioned to the months are suitably subdivided so that sufficient accuracy may be obtained as regards date. At the centre of the mouth circle B is fixed a pivot D to which it attached so as to be free to rotate, a disc C whose circumference is divided according to the number of ovulation periods in the two years— in this particular case into 26 parts which is the number when they occur every 28 days. The divisions are marked M and F alternately to represent male and female sexes. At the extremities of any diameter passing through two of the ovulation divisions two arrows are formed, one being marked M and the other F. At right angles to this diameter is drawn another which meets the circumference halfway between two of the ovulation divisions at either extremity. On this disc is shown suitable lettering or wording to enable clear instructions to be given as to the manner of use. The particular form illustrated in Fig. 3, only gives correct results for ovulation periods of 28 days, that is, 13 periods in the year.

To predict the sex of a child with the model illustrated in Fig. 3:—

Given the approximate date of birth, the date of birth and sex of previous child born.

Place the arrow marked according to the sex of last child born, on the date of its birth, on either semi-circumference: the procedure then depends on whether the number of years whole and/or part—which number is obtained by subtracting one year from the other, for example 1918 minus 1913 equals five, which is an odd number of years and is to be taken whether the time intervening is more than or less than five years—is odd or even. If the number of years, obtained as described above be even, the disc C is not moved, and if the month of second birth comes before the month of previous one take the reading on that side of the diametral line which is now opposite the date of first birth. The sex of the child is that found nearest to the date of its birth. If the number of years be odd, turn the disc C through half a revolution before taking the reading. If the month of second birth comes after the month of previous one, take the reading on that side of the diametral line which is marked after and followed by the letter representing the sex which is now opposite the date of first birth. The same appliance may be used for determining the sex by marking two radial lines on the disc C or on a superimposed transparent disc, so that the angle between them and radii through the arrows represents, both in sign and magnitude, the period of gestation of 280 days.

*3rd method.*

Another method (is illustrated in Fig. 10) in which flat discs are employed, and which is similar in nature to the second method, has one part B' marked with the months of the year for two years, and a loose disc C' mounted for rotation about an eyelet or rivet D', which instead of being marked circumferentially with letters representing the two sexes, is marked S and O alternately, and possesses one main arrow only, marked Odd and a small arrow marked Even diametrically opposite. S signifies the same sex as that for which the arrow is used and O signifies the opposite sex. For example, if the sex of the last child born were a girl and the main arrow were placed opposite the date of its birth, every O would represent the male sex, and every S the female sex and vice versa. In reading this appliance the number of years is calculated as previously described for the second method. If the number of years be odd, and the month of birth of second child is earlier in the calendar than that of last child born, proceed anticlockwise from the arrow marked Odd until the date is found: if the month be later in the calendar, proceed clockwise until the date be found. If the number of years be even, follow the same procedure starting from the arrow marked Even. In this appliance the diametrical line is omitted, also the wording or lettering referred to in the second method. A line showing the period of gestation can be shown as previously described.

*4th method.*

Figs. 4, 5, 6, 7, 8, 9, show parts of another form of appliance for effecting both prediction and predetermination of sex.

Fig. 4 shows the appliance, ready for use, employing a disc 1 on which the annulus projecting beyond the disc 2 is divided into twelve monthly parts; these divisions may be subdivided for greater accuracy. Disc 2, in Fig. 4 has two rings 6 and 7 which are divided so that each ring contains the number of ovulation periods, of 28 days each, per annum, the datum point being the head of the arrow 3. The disc 2 shown in Fig. 5 is divided for ovulation periods of 26 days, that in Fig. 6 for periods of 27 days, that in Fig. 7 for periods of 29 days and that in Fig. 8 for periods of 30 days. Any one of these discs 2 in Figs. 4, 5, 6, 7, 8 can be used with the disc 1 in Fig. 4. In Figs. 4, 6, 7, the small arrows indicate the sequence of the ovulations. Fig. 9 shows a transparent disc marked with two lines 4 and 5 (B and F); the angle from B to F in an anti-clockwise direction represents the period of gestation. This transparent disc is superimposed on any of the discs 2 for the purpose of predetermination and is employed in the same manner as previous described. Near the centres of the discs 2 in Figs. 4, 6, 7 is stated which rings correspond to the particular years over which calculations are being made, for example in Fig. 4, if the number of years between the births obtained as previously described, is eight, the innermost annular ring will show the correct sex. Instead of using the transparent disc in Fig. 9, the lines 4 and 5 may be marked on each of the discs 2. Calculations are made in the same manner as described in the other methods.

What I claim as my invention and desire to secure by Letters Patent of the United States of America is:—

1. In a device of the kind described, the combination of a graduated surface divided into main divisions marked to represent months of the year and further subdivided to represent portions of said months, said main divisions covering a period of at least one pear, a second graduated member movably mounted with relation to and supported by the graduated surface, said graduated member being divided into a number of main divisions according to the number of ovulation periods occurring in the period of at least one year, each main division of the movable member being marked to represent male and female sexes, an indicator associated with said graduated surface and graduated, movable member by means of which a chosen subdivision on the movable member may be brought to register with a subdivision on the graduated surface to enable a chosen date on the graduated surface to indicate by means of said indicator one of the alternately marked divisions on the movable member.

2. In a device of the kind described, the combination of three cylinders with their axes in line and two of which are freely rotatable relatively to each other and to the third cylinder, one of said cylinders being divided on its periphery into main divisions representing successive months to cover a period of at least one year and each main division being further subdivided to represent portions of a month, the second cylinder being graduated spirally the spiral having its width subdivided into as many parts as there are ovulation periods to be provided for, such parts of the main spiral being subdivided and graduated longitudinally to represent the different ovulation periods, and a third cylinder carrying a fixed pointer having one edge thereof cooperating with the markings on each of the first and second cylinders and a second pointer slidably mounted on said fixed pointer and cooperating with spirally graduated divisions and subdivisions on said second cylinder, for the purposes set forth.

3. In a device of the kind described the combination of three cylinders arranged about a common axis and two of which are freely rotatable relatively to each other and to the third cylinder, one of said cylinders being divided on its periphery into main divisions representing successive months to cover a period of at least one year, and each main division being further subdivided to represent portions of a month, the second cylinder being graduated spirally, so that each complete spiral turn represents one of a period of years, and a third cylinder carrying a fixed pointer having one edge thereof cooperating with the markings on each of the first and second cylinders, for the purposes set forth.

In witness whereof I affix my signature.

HUBERT ROYDS TIDSWELL.